United States Patent
Rausch

(10) Patent No.: US 11,796,393 B2
(45) Date of Patent: Oct. 24, 2023

(54) POLARIMETRY CAMERA FOR HIGH FIDELITY SURFACE CHARACTERIZATION MEASUREMENTS

(71) Applicant: Valve Corporation, Bellevue, WA (US)

(72) Inventor: Kameron Wade Rausch, Sammamish, WA (US)

(73) Assignee: Valve Corporation, Bellevue, WA (US)

(*) Notice: Subject to any disclaimer, the term of this patent is extended or adjusted under 35 U.S.C. 154(b) by 75 days.

(21) Appl. No.: 17/126,853

(22) Filed: Dec. 18, 2020

(65) Prior Publication Data

US 2021/0247234 A1 Aug. 12, 2021

Related U.S. Application Data

(60) Provisional application No. 62/975,065, filed on Feb. 11, 2020.

(51) Int. Cl.
*G01J 4/04* (2006.01)
*G01N 21/17* (2006.01)
*G01N 21/59* (2006.01)

(52) U.S. Cl.
CPC ............ *G01J 4/04* (2013.01); *G01N 21/17* (2013.01); *G01N 2021/1772* (2013.01); *G01N 2021/5957* (2013.01)

(58) Field of Classification Search
CPC .. G01J 4/04; G01J 2004/002; G01J 2004/004; G01N 21/17; G01N 2021/1772;
(Continued)

(56) References Cited

U.S. PATENT DOCUMENTS

| 6,982,773 B2 | 1/2006 | Kurtz et al. |
| 7,160,017 B2 | 1/2007 | Lee et al. |
| (Continued) | | |

FOREIGN PATENT DOCUMENTS

| CN | 104833424 A | * | 8/2015 | ............. B64D 47/08 |
| GB | 2527783 A | * | 1/2016 | ........... G02B 5/3083 |
| WO | WO-2014159045 A1 | * | 10/2014 | ................ F21V 9/14 |

OTHER PUBLICATIONS

Hornburg et al., "Multiband retardation control using multi-twist retarders," Proc. of SPIE, Polarization: Measurement, Analysis, and Remote Sensing XI, vol. 9099, 90990Z, 2014, 9 pages.
(Continued)

*Primary Examiner* — Mohamed K Amara
(74) *Attorney, Agent, or Firm* — SEED INTELLECTUAL PROPERTY LAW GROUP LLP

(57) ABSTRACT

Systems and methods for providing a polarimetry camera operative to obtain high fidelity surface characterization measurements. A polarimetry camera may include an multi-twist retarder component that is operative selectively switch between two or more polarization filtering states, wherein in each polarization filtering state, the multi-twist retarder component only passes light having a particular polarization state or orientation (e.g., horizontal linear polarization, vertical linear polarization, 45 degree linear polarization, circular polarization) and reflects or absorbs light having other polarization states. The multi-twist retarder may also include one or more diffraction patterns that focus light. The polarimetry camera may capture images using a sensor array as the multi-twist retarder is switched between the at least two polarization filtering states, thereby capturing a sequence of polarization specific images that may be displayed or used to determine one or more Stokes parameters for a scene in real-time.

21 Claims, 3 Drawing Sheets

(58) Field of Classification Search
CPC ........... G01N 2021/5957; G01N 21/21; G01N 21/23; G02B 27/286; G02B 5/3083; G02B 5/30; F21V 9/14; G02F 1/13363; G02F 1/133636; G02F 1/133638; G02F 1/1347; G02F 1/13476
See application file for complete search history.

(56) References Cited

U.S. PATENT DOCUMENTS

| | | | |
|---|---|---|---|
| 7,289,211 | B1 | 10/2007 | Walsh, Jr. et al. |
| 7,295,312 | B1 | 11/2007 | Gerhart et al. |
| 8,004,675 | B2 | 8/2011 | Lefaudeux |
| 8,235,533 | B2 | 8/2012 | Hudman et al. |
| 8,368,889 | B2 | 2/2013 | Schwiegerling et al. |
| 8,982,313 | B2 | 3/2015 | Escuti et al. |
| 9,116,390 | B2* | 8/2015 | Powell ............... G02F 1/13363 |
| 9,298,041 | B2 | 3/2016 | Escuti et al. |
| 9,335,586 | B2 | 5/2016 | Escuti et al. |
| 9,410,677 | B2 | 8/2016 | Wheatley et al. |
| 10,203,489 | B2 | 2/2019 | Khan et al. |
| 10,760,967 | B2* | 9/2020 | Hegyi ............... G01J 3/0256 |
| 10,962,855 | B2* | 3/2021 | Schowengerdt ..... G02B 6/0055 |
| 11,009,595 | B1* | 5/2021 | Carlson ............... G02B 27/283 |
| 11,067,860 | B2* | 7/2021 | Oh ............... G02B 3/00 |
| 11,231,612 | B2* | 1/2022 | Oh ............... G06T 19/006 |
| 11,294,165 | B2* | 4/2022 | Deisseroth ............. H04N 23/69 |
| 2005/0093796 | A1* | 5/2005 | Fergason ............. H04N 9/3167 348/E5.145 |
| 2005/0128481 | A1* | 6/2005 | Sharps ............... G01J 4/04 356/364 |
| 2006/0139532 | A1* | 6/2006 | Berman ............... H04N 5/7441 348/E9.027 |
| 2007/0241267 | A1 | 10/2007 | Gruev et al. |
| 2008/0144177 | A1* | 6/2008 | Miller ............... H01J 5/16 250/226 |
| 2009/0135422 | A1 | 5/2009 | Miller et al. |
| 2010/0157298 | A1* | 6/2010 | Hayter ............... G01J 4/04 359/465 |
| 2011/0122409 | A1* | 5/2011 | Hsieh ............... G01N 21/21 356/365 |
| 2011/0310220 | A1 | 12/2011 | McEldowney |
| 2012/0050517 | A1* | 3/2012 | Harding ............... G02B 21/002 359/368 |
| 2013/0027656 | A1* | 1/2013 | Escuti ............... G02B 5/3083 349/193 |
| 2013/0286479 | A1 | 10/2013 | Sung et al. |
| 2013/0300936 | A1* | 11/2013 | Jannard ............... H04N 9/3188 348/571 |
| 2013/0300948 | A1* | 11/2013 | Jannard ............... H04N 9/3164 348/756 |
| 2015/0131311 | A1 | 5/2015 | Wheatley et al. |
| 2016/0182889 | A1 | 6/2016 | Olmstead |
| 2016/0349516 | A1 | 12/2016 | Alexander et al. |
| 2019/0162999 | A1* | 5/2019 | Hegyi ............... G01J 3/45 |
| 2019/0204217 | A1* | 7/2019 | Hegyi ............... G01J 3/4531 |
| 2019/0243147 | A1 | 8/2019 | Smithwick et al. |
| 2019/0377183 | A1 | 12/2019 | Sharp |
| 2020/0301147 | A1 | 9/2020 | Klug |
| 2021/0247556 | A1* | 8/2021 | Hudman ............ G02B 27/0176 |

OTHER PUBLICATIONS

Hornburg et al., "Wide color gamut multi-twist retarders," Proc. of SPIE, Emerging Liquid Crystal Technologies X, vol. 9384, 93840W, 2015, 11 pages.

ImagineOptix, "Consumer Electronics Optics," Augmented and Virtual Reality Optics Technology in Consumer Electronics—ImagineOptix, retrieved from <https://www.imaginoptix.com/applications/consumer-electronics/>, on Dec. 17, 2019, 3 pages.

Komandur et al., "Multi-twist retarders for broadband polarization transformation," Proc. of SPIE, Emerging Liquid Crystal Technologies VII, vol. 8279, 82790E, 2012, 10 pages.

Komanduri et al., "Multi-twist retarders: broadband retardation control using self-aligning reactive liquid crystal layers," Optics Express, Optical Society of America, vol. 21, No. 1 Jan. 14, 2013, 17 pages.

Perreault, "Triple Wollaston-prism complete-Stokes imaging polarimeter," Optics Letters, Optical Society of America, vol. 38, No. 19, Oct. 1, 2013, 4 pages.

Bueno et al., "Double-pass imaging polarimetry in the human eye," *Optics Letters 24* (1): 64-66, Jan. 1, 1999.

Komanduri et al., "Multi-twist retarders for broadband polarization transformation," *Proc. of SPIE—The Int'l Society for Optical Engineering 2*: 11 pages, Feb. 2012.

Chung et al., "Achromatic linear polarization rotators by tandem twisted nematic liquid crystal cells," *Scientific Reports* (8): 1-13, Sep. 12, 2018.

International Search Report and Written Opinion, dated May 19, 2021, for International Patent Application No. PCT/US2020/065967. (10 pages).

* cited by examiner

POLARIMETRY CAMERA FOR HIGH FIDELITY SURFACE CHARACTERIZATION MEASUREMENTS

BACKGROUND

Technical Field

The present disclosure generally relates to imaging, and more particularly, to systems and methods of providing polarimeters that generate high fidelity surface characterization measurements.

Description of the Related Art

The measurement of light may be useful in various fields, such as science, industry, security, and other fields. In addition to intensity and wavelength, polarization of light may be measured to characterize various objects or scenes. In general, polarimetry is the measurement and interpretation of the polarization of transverse waves, most notably electromagnetic waves, such as radio or light waves. Typically polarimetry is done on electromagnetic waves that have traveled through or have been reflected, refracted or diffracted by some material in order to characterize that object. Polarimeter cameras (or "polarimeters") may be used in remote sensing, characterization of aerosol particles, planetary detection, quality control, biological activity measurements or detection, and numerous other applications.

To measure the characteristics of an object or scene based on polarization of scattered or reflected light, a polarimeter may need to be operative to measure linear polarization and/or circular polarization of light emanating from the object. Existing designs utilize complex arrangements of beam splitters, polarization elements, or moving parts to separate polarization states in space, and may require separate imaging components (e.g., lenses, retarders, sensor arrays) to capture the required polarization information. As an example, some polarimeters utilize a Wollaston prism to separate light in space based on its polarization, so that the separate polarization components may be analyzed individually. However, these types of polarimeters may be relatively large in size, and may also require multiple optical paths and associated components, which may cause spatial registration errors and further increases complexity, cost, reliability, and spatial requirements.

BRIEF SUMMARY

A polarimetry camera may be summarized as including a multi-twist retarder component operative to be selectively switched between at least two polarization filtering states, wherein, in each polarization filtering state, the multi-twist retarder component passes light having a different one of at least two corresponding polarization states; a sensor array operative to capture two dimensional images from light that passes through the multi-twist retarder component; a controller operatively coupled to the multi-twist retarder component and the sensor array, the controller configured to cause the multi-twist retarder component to sequentially cycle through the at least two polarization filtering states at a polarization state change rate; when the multi-twist retarder component is in each polarization filter state during the cycling, cause the sensor array to capture at least one image; and store the captured images in at least one non-transitory processor-readable storage medium.

The at least two polarization filtering states may include four polarization filtering states. The polarization state change rate may be greater than or equal to 30 polarization filtering state changes per second. When the multi-twist retarder component is in each polarization filter state during the cycling, the controller may cause the sensor array to capture exactly one image. The at least two polarization states may include three unique linear polarization states and one circular polarization state. The at least two polarization states may include a horizontal linear polarization state, a vertical linear polarization state, and 45 degree linear polarization state. The sensor array may include one of a charge-coupled device (CCD) or a complementary metal-oxide-semiconductor (CMOS) active pixel sensor.

The polarimetry camera may further include an optic positioned between the multi-twist retarder component and the sensor array, the optic operative to focus light onto the sensor array.

The polarimetry camera may further include an optic positioned between the multi-twist retarder component and the sensor array, the optic operative to filter light from the multi-twist retarder component with respect to at least one characteristic. The controller may be operative to process the captured images to generate one or more Stokes parameters. The controller may be operative to process the captured images to generate one or more Stokes parameters for each of at least a subset of pixels of the sensor array. The controller may be operative to process the captured images to generate one or more Stokes parameters in real-time during capture of the images. The controller may be operative to cause at least one polarization-specific video to be displayed on a display, the at least one video including a sequence of images captured for one of the polarization filtering states of the multi-twist retarder component.

A method of operating a polarimetry camera, the polarimetry camera including a multi-twist retarder component operative to be selectively switched between at least two polarization filtering states, wherein, in each polarization filtering state, the multi-twist retarder component passes light having a different one of at least two corresponding polarization states, the polarimetry camera further including a sensor array operative to capture two dimensional images from light that passes through the multi-twist retarder component, the method may be summarized as including causing the multi-twist retarder component to sequentially cycle through the at least two polarization filtering states at a polarization state change rate; when the multi-twist retarder component is in each polarization filter state during the cycling, causing the sensor array to capture at least one image; and storing the captured images in at least one nontransitory processor-readable storage medium.

The at least two polarization filtering states may include four polarization filtering states. The polarization state change rate may be greater than or equal to 30 polarization filtering state changes per second. Causing the sensor array to capture at least one image may include causing the sensor array to capture exactly one image when the multi-twist retarder component is in each polarization filter state during the cycling.

The method may further include processing the captured images to generate one or more Stokes parameters. Processing the captured images to generate Stokes parameters may include processing the captured images to generate one or more Stokes parameters for each of at least a subset of pixels of the sensor array.

The method may further include processing the captured images to generate one or more Stokes parameters in real-time during capture of the images.

The method may further include causing at least one video to be displayed on a display, the at least one video including a sequence of images captured for one of the polarization filtering states of the multi-twist retarder component.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
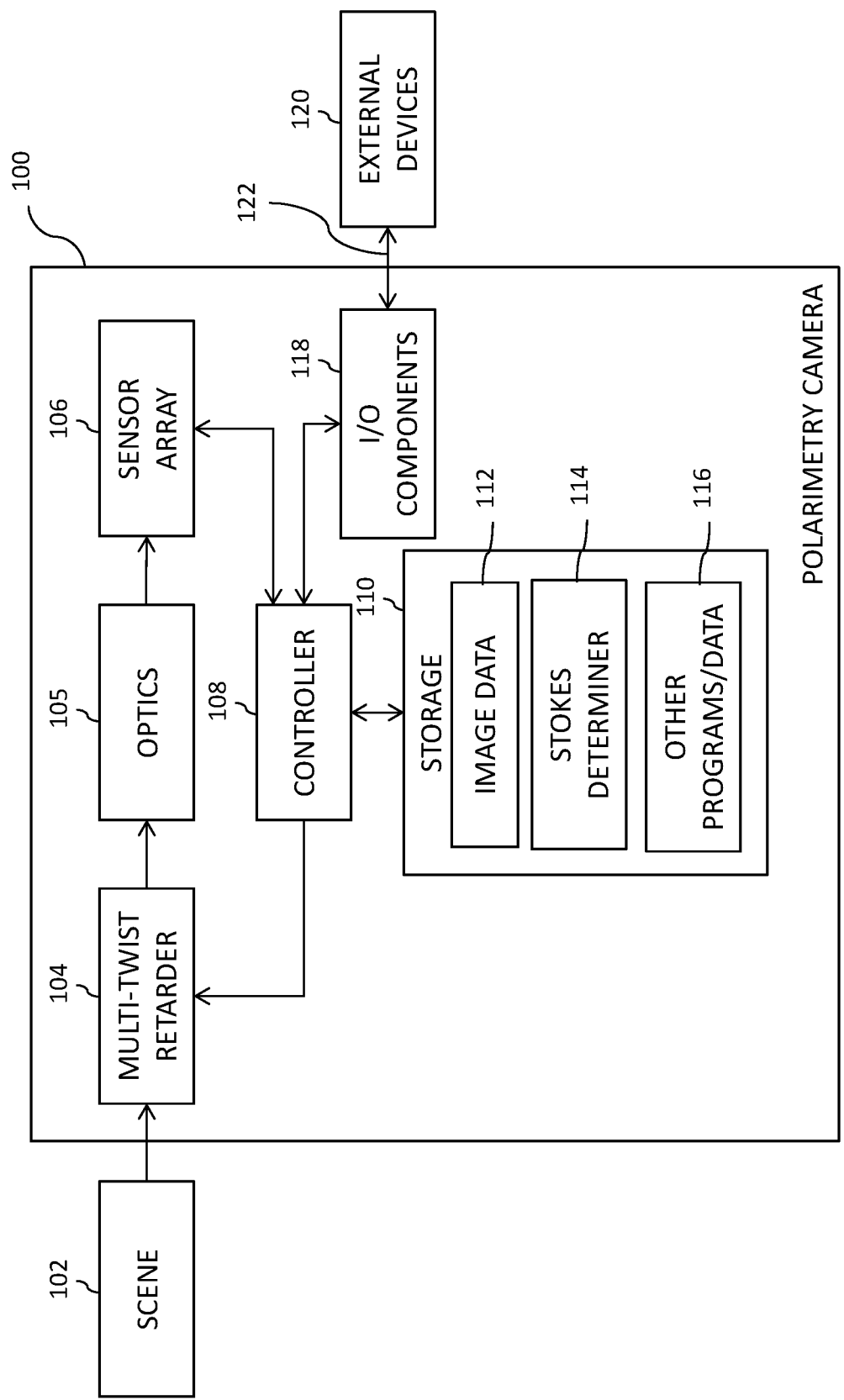
FIG. 1 is a schematic block diagram of an example polarimetry camera, according to one non-limiting illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods for providing a polarimetry camera operative to obtain high fidelity surface characterization measurements. A polarimetry camera may include a multi-twist retarder component that is operative to selectively switch between two or more polarization filtering states, wherein when in each polarization filtering state, the multi-twist retarder component only passes light having a particular polarization state or orientation (e.g., horizontal linear polarization, vertical linear polarization, 45 degree linear polarization, circular polarization) and reflects or absorbs light having other polarization states. The polarimetry camera may capture images using a sensor array as the multi-twist retarder is switched between the at least two polarization filtering states, thereby capturing sequences of polarization-specific images or video that may be displayed or used to determine Stokes parameters for a scene in real-time. Advantageously, the polarimetry camera may not require spatial separation of received light and may not have any moving parts, which reduces the required dimensions for the camera, the complexity, and the cost, and also improves reliability. Improved reliability and performance may be particularly beneficial in various applications where the polarimetry camera is subject to harsh conditions (e.g., temperature, vibration), and/or applications where maintenance and replacement of components are particularly burdensome.

Figure 2:
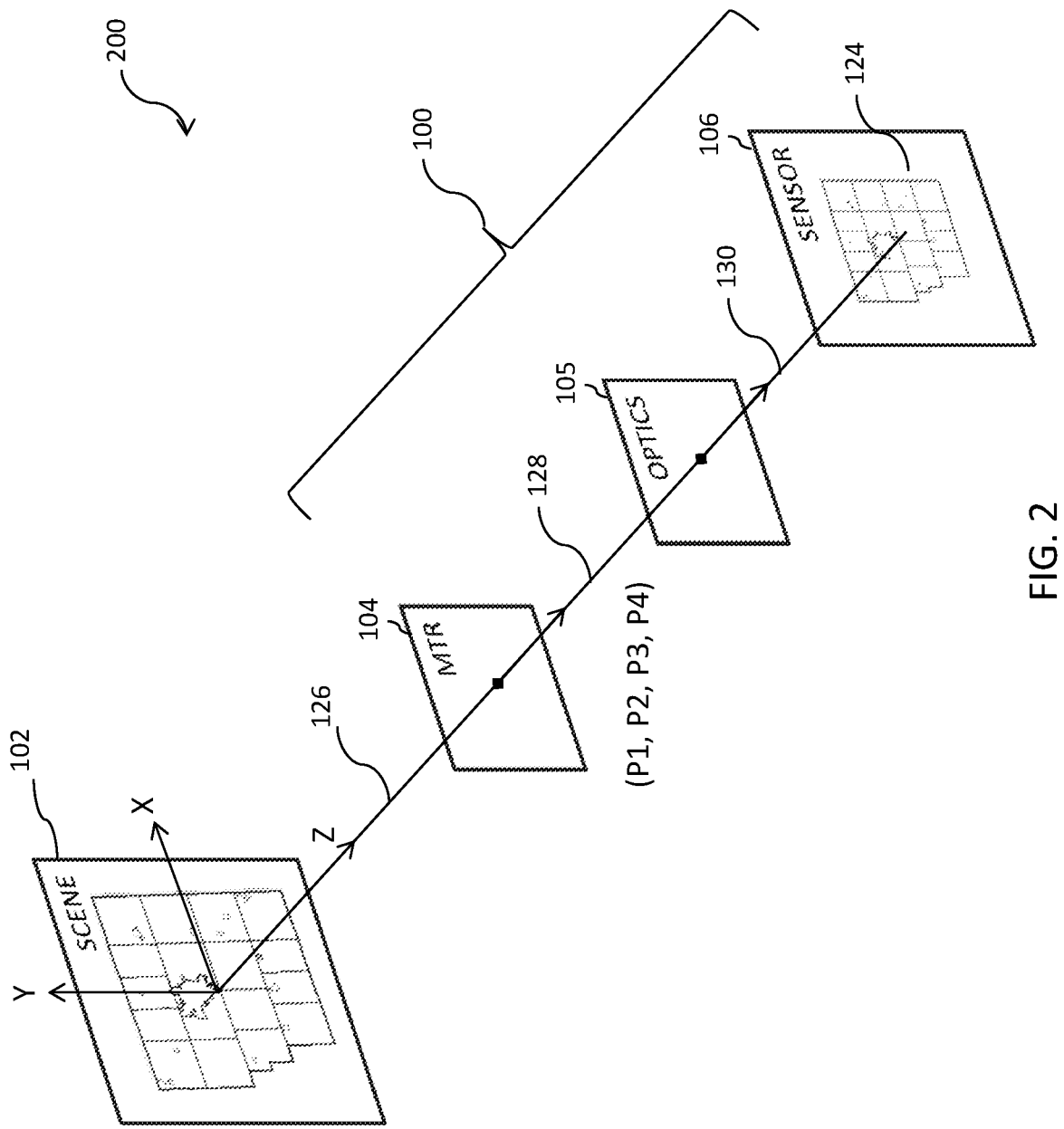
FIG. 2 is a perspective view of components of the polarimetry camera of FIG. 1 showing an example operation thereof, according to one non-limiting illustrated implementation.
Figure 3:
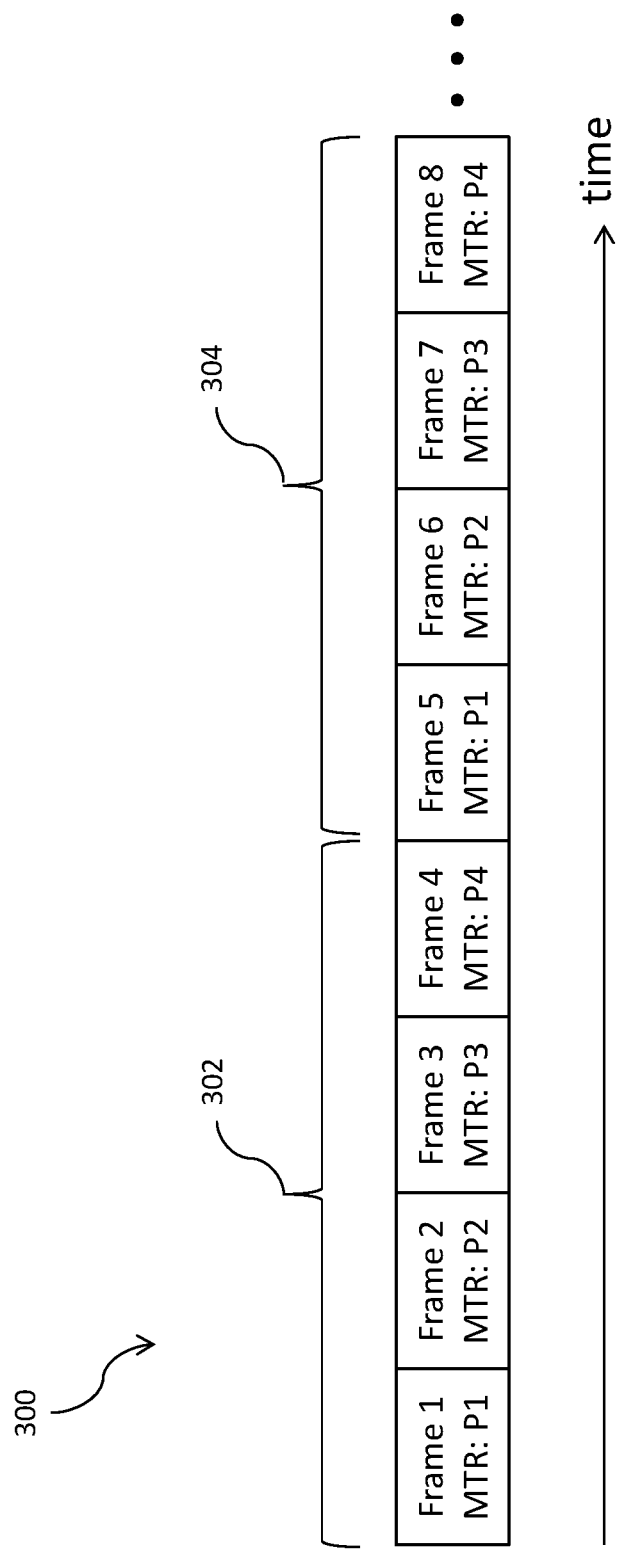
FIG. 3 is a diagram that shows an example sequence for capturing images sequentially while a multi-twist retarder cycles through polarization filtering states to obtain time-multiplexed polarization specific image data that may be used to determine Stokes parameters, according to one non-limiting illustrated implementation.

FIGS. 1-3 illustrate an example embodiment of a polarimetry camera 100 of the present disclosure that may be used to determine polarization profiles of points in a scene 102 from image or video frames using Stokes parameters or other measurements. Advantageously, the systems and methods described herein may generate Stokes parameters more rapidly, reliably, and accurately than conventional methods, while also requiring a smaller form factor in at least some embodiments by providing a single optical path and utilizing thin film optical components. The polarimetry camera 100 may generally include a multi-twist retarder component 104, optics 105, a sensor array 106, and a controller 108 operatively coupled to the multi-twist retarder component and the sensor array. The multi-twist retarder component 104, which may include one or more multi-twist retarders, may be operative to be selectively switched between at least two polarization filtering states. In each polarization filtering state, the multi-twist retarder component 104 passes light having a different one of at least two corresponding polarization states and absorbs or reflects light of other polarization states or orientations.

The sensor array 106 may be operative to capture two dimensional images from light that passes through the multi-twist retarder component 104 and is focused by the optics 105. Generally, the controller 108 may be configured to cause the multi-twist retarder component 104 to sequentially cycle through the at least two polarization filtering states at a polarization state change rate (e.g., greater than 10 per second, greater than 30 per second, greater than 50 per second). When the multi-twist retarder component is in each polarization filter state during the cycling, the controller 108 may cause the sensor array 106 to capture at least one image (e.g., one image, two images, numerous images). The controller 108 may store the captured images in at least one nontransitory processor-readable storage medium, such a data storage 110, as image data 112. As discussed further below, the polarimetry camera 100 may include a Stokes determiner module 114 that is operative to process the image data 112 to determine some or all of the Stokes parameters for the scene 102.

The multi-twist retarder component 104 may be formed of birefringent materials. Birefringence is the property of a material that has a refractive index that depends on the polarization and propagation direction of light. The multi-twist retarder alters the polarization state or phase of light traveling through it. The multi-twist retarder may have a slow axis (or extraordinary axis) and a fast axis (ordinary axis). As polarized light travels through the multi-twist retarder, the light along the fast axis travels more quickly than along the slow axis. Generally, the multi-twist retarder component 104 is a waveplate-like retardation film that may be configured to provide precise and customized levels of broadband, narrowband or multiple band retardation in a single thin film. More specifically, the multi-twist retarder component 104 includes two or more twisted liquid crystal (LC) layers on a single substrate and with a single alignment layer. Subsequent LC layers are aligned directly by prior layers, allowing simple fabrication, achieving automatic layer registration, and resulting in a monolithic film with a continuously varying optic axis. As discussed elsewhere herein, the multi-twist retarder 104 is switchable into a plurality of polarization filtering states and, in at least some implementations, may also include static or switchable diffraction patterns that focus light onto the sensor array. The multi-twist retarder component 104 may include a single multi-twist retarder, or may include a plurality of multi-twist retarders arranged proximate each other (e.g., in a stacked arrangement). Dependent on the particular application, the multi-twist retarder component 104 may be configured to work on one or more particular ranges of wavelengths (e.g., visible, specific color, infrared).

In at least some implementations, the polarimetry camera 100 may include the data storage 110 that stores image data 112, a Stokes determiner module 114, and/or other programs and data 116. The polarimetry camera 100 may also include various I/O components 118, which may include one or more user interfaces (e.g., buttons, touch pads, speakers), displays, one or more wired or wireless communications interfaces, etc. As an example, the I/O components 118 may include a communications interface that allows the polarimetry camera 100 to communicate with an external device 120 over a wired or wireless communications link 122. As non-limiting examples, the external device 120 may include a host computer, a server, a mobile device (e.g., smartphone, wearable computer), etc. The various components of the polarimetry camera 100 may be housed in a single housing, may be housed in one or more separate housings (e.g., host computer), or any combinations thereof.

As noted above, the polarimetry camera 100 may be used for the determination of polarization profiles of points in the scene 102 from video or image frames 124 (FIG. 2) using Stoke parameters (e.g., parameters $S_0$, $S_1$, $S_2$, and $S_3$). The polarimetry camera 100 may be operative to generate a sufficient number of unique scene images 124 to determine the respective Stokes parameters in real-time (or near real-time). Such parameters may be used to characterize one or more objects in the scene 102.

In at least some implementations, the multi-twist retarder component 104 may be controlled to selectively switch between or cycle through a plurality (e.g., two, three, four) of polarization filtering states. The time required to obtain unique images needed to determine the Stokes parameters may be determined at least in part by the switching rate of the multi-twist retarder component 104 and the frame rate of the sensor array 106. As an example, in an implementation wherein the multi-twist retarder component 104 switches between four polarization filtering states (e.g., three linear polarization states or orientations and one circular polarization state), the time required to capture four unique images may be the time required for the multi-twist retarder component 104 to switch between the four states while the sensor array 106 captures at least one image while the multi-twist retarder is in each polarization filtering state.

In the example 200 illustrated in FIG. 2, the scene 102 may have a horizontal axis X, a vertical axis Y that is perpendicular to the X axis, and a Z axis that is perpendicular to the X and Y axes. The operator of the polarimetry camera 100 desires to obtain polarization information for the scene 102, which may be one or more objects, a landscape, or any other scene.

As discussed above, the multi-twist retarder component 104 may be switchable into a plurality of polarization filtering states. As an example, the multi-twist retarder may be configurable into four polarization states that respectively pass horizontal linearly polarized light, vertical linearly polarized light, 45 degree (or other angle) linearly polarized light, and circularly polarized light.

As shown by the example frame sequence 300 in FIG. 3, in operation, the controller 108 may cause the multi-twist retarder component 104 to iteratively cycle through different polarization filtering states P1, P2, P3, and P4 while also controlling the sensor array 106 to capture images or frames. In the illustrated frame sequence 300, a set of four frames (e.g., a set 302 including frames 1-4, a set 304 including frames 5-8) corresponds to four images that were each captured when the multi-twist retarder component 104 was in a different one of the four polarization filtering states P1, P2, P3, P4. Thus, the polarimetry camera 100 may generate four independent polarization-specific image sequences or videos, with each video capturing the scene 102 using a different polarization filter provided by the multi-twist retarder component 104.

The optics 105 may include one or more lenses that focuses light received from the multi-twist retarder component 104 onto the sensor array 106. The optics 105 may further include one or more other optics that filter or modify at least one characteristic of light, such a color filter or other type of optic. The optics 105 may include a plurality of optical elements, and may be located at different positions in the optical path than shown in the example illustrations. In at least some implementations, the multi-twist retarder component 104 may be configured to provide one or more static or dynamic diffraction patterns that may be operative to focus light on the sensor array 106. In such implementations, the optics 105 may be modified or even omitted.

As non-limiting examples, the sensor array 106 may include a two dimensional sensory array, such as a charge coupled device (CCD) or a complementary metal-oxide-semiconductor (CMOS) sensor array. More generally, the sensor array 106 may be implemented using any appropriate light receptors that provide suitable functionality for a particular application.

The scene 102 presents (e.g., reflects) light rays 126 that may be received by the multi-twist retarder component 104.

Although not shown for clarity, the polarimetry camera 100 may include one or more optical elements positioned between the scene 102 and the multi-twist retarder component 104. The light rays 126 are generally emitted in the direction of the Z axis shown in FIG. 2. The multi-twist retarder component 104 may present a ray 128 to the optics 105 that is polarized in a polarization state or orientation (e.g., P1, P2, P3, or P4) dependent on the current polarization filtering state of the multi-twist retarder component 104. The optic 105 may present a respective polarized ray 130 to the sensor array 106 as the scene image 124.

The polarization filtering states of the multi-twist retarder component 104 may have any orientation with respect to the sensor array 106. As a non-limiting example, in at least some implementations the multi-twist retarder component may be configured to implement a first polarization filtering state that provides a linear polarizer in which the transmission axis is horizontally oriented, a second polarization filtering state that provides a linear polarizer in which the transmission axis is vertically oriented, a third polarization filtering state that provides a linear polarizer in which the transmission axis is oriented at an angle of 45 degrees with respect to horizontal, and a fourth polarization filtering state that provides a circular polarizer in which the fast axis is vertically oriented.

The image or video frames 124 may be stored as image data 112 (FIG. 1) in the data storage 110, and may be processed using the Stokes determiner module 114 or other program, as discussed herein. For instance, the Stokes determiner module may utilize the pixel values for one or more sets of four polarization-specific images to obtain the Stokes parameters for each point in the scene 102 using known equations. The Stokes parameters may be provided to a user via a display or communicated to the user in any other manner. In at least some implementations, the polarimetry camera 100 may display the polarization-specific video or images of the scene 102 to the user via a display.

It will be appreciated that the illustrated computing system and devices are merely illustrative and are not intended to limit the scope of the present disclosure. For example, the polarimetry camera 100 and/or the external device 120 may be connected to other devices that are not illustrated, including through one or more networks such as the Internet or via the Web. More generally, such a computing system or device may comprise any combination of hardware that can interact and perform the described types of functionality, such as when programmed or otherwise configured with appropriate software, including without limitation desktop computers, laptop computers, slate computers, tablet computers, head-mounted display (HMD) systems, or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate intercommunication capabilities. For example, the illustrated polarimetry camera 100 may include executable software instructions and/or data structures in at least some embodiments, which when loaded on and/or executed by particular computing systems or devices, may be used to program or otherwise configure those systems or devices, such as to configure processors of those systems or devices. Alternatively, in other embodiments, some or all of the software systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity.

Thus, in at least some embodiments, the illustrated systems are software-based systems including software instructions that, when executed by the processor(s) and/or other processor means, program the processor(s) to automatically perform the described operations for that system. Furthermore, in some embodiments, some or all of the systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Those of skill in the art will recognize that many of the methods or algorithms set out herein may employ additional acts, may omit some acts, and/or may execute acts in a different order than specified.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A polarimetry camera, comprising:
a multi-twist retarder component operative to be selectively switched between at least two polarization filtering states, wherein, in each of the at least two polarization filtering states, the multi-twist retarder component passes light having a unique polarization and reflects or absorbs light having a polarization that is different from the unique polarization;
a sensor array operative to capture two dimensional images from light that passes through the multi-twist retarder component;

a controller operatively coupled to the multi-twist retarder component and the sensor array, the controller configured to:
cause the multi-twist retarder component to sequentially cycle through the at least two polarization filtering states at a polarization filtering state change rate;
cause the sensor array to capture at least one image during each instance that the multi-twist retarder component is in each of the at least two polarization filtering states as the multi-twist retarder component is sequentially cycled through the at least two polarization filtering states; and
generate a first polarization-specific video and a second polarization-specific video, the first polarization-specific video comprising a first sequence of images captured while the multi-twist retarder component is in a first one of the polarization filtering states, and the second polarization-specific video comprising a second sequence of images captured while the multi-twist retarder component is in a second one of the polarization filtering states.

2. The polarimetry camera of claim 1 wherein the at least two polarization filtering states comprises four polarization filtering states.

3. The polarimetry camera of claim 1 wherein the polarization filtering state change rate is greater than or equal to 30 polarization filtering state changes per second.

4. The polarimetry camera of claim 1 wherein, when the multi-twist retarder component is in each polarization filter state during the cycling, the controller causes the sensor array to capture exactly one image.

5. The polarimetry camera of claim 1 wherein the at least two polarization filtering states comprise three unique linear polarization filtering states and one circular polarization filtering state.

6. The polarimetry camera of claim 1 wherein the at least two polarization filtering states comprises a horizontal linear polarization filtering state, a vertical linear polarization filtering state, and 45 degree linear polarization filtering state.

7. The polarimetry camera of claim 1 wherein the sensor array comprises one of a charge-coupled device (CCD) or a complementary metal-oxide-semiconductor (CMOS) active pixel sensor.

8. The polarimetry camera of claim 1, further comprising:
an optic positioned between the multi-twist retarder component and the sensor array, the optic operative to focus light onto the sensor array.

9. The polarimetry camera of claim 1, further comprising:
an optic positioned between the multi-twist retarder component and the sensor array, the optic operative to filter light from the multi-twist retarder component with respect to at least one characteristic.

10. The polarimetry camera of claim 1 wherein the controller is operative to process the captured images to generate one or more Stokes parameters.

11. The polarimetry camera of claim 1 wherein the controller is operative to process the captured images to generate one or more Stokes parameters for each of at least a subset of pixels of the sensor array.

12. The polarimetry camera of claim 1 wherein the controller is operative to process the captured images to generate one or more Stokes parameters in real-time during capture of the images.

13. The polarimetry camera of claim 1 wherein the controller is further operative to:
generate a third polarization-specific video and a fourth polarization-specific video, the third polarization-specific video comprising a third sequence of images captured while the multi-twist retarder component is in a third one of the polarization filtering states, and the fourth polarization-specific video comprising a fourth sequence of images captured while the multi-twist retarder component is in a fourth one of the polarization filtering states.

14. A method of operating a polarimetry camera, the polarimetry camera comprising a multi-twist retarder component operative to be selectively switched between at least two polarization filtering states, wherein, in each of the at least two polarization filtering states, the multi-twist retarder component passes light having a unique polarization and reflects or absorbs light having a polarization that is different from the unique polarization, the polarimetry camera further comprising a sensor array operative to capture two dimensional images from light that passes through the multi-twist retarder component, the method comprising:
causing the multi-twist retarder component to sequentially cycle through the at least two polarization filtering states at a polarization filtering state change rate;
causing the sensor array to capture at least one image during each instance that the multi-twist retarder component is in each of the at least two polarization filtering states as the multi-twist retarder component is sequentially cycled through the at least two polarization filtering states; and
generating a first polarization-specific video and a second polarization-specific video, the first polarization-specific video comprising a first sequence of images captured while the multi-twist retarder component is in a first one of the polarization filtering states, and the second polarization-specific video comprising a second sequence of images captured while the multi-twist retarder component is in a second one of the polarization filtering states.

15. The method of claim 14 wherein the at least two polarization filtering states comprise four polarization filtering states.

16. The method of claim 14 wherein the polarization filtering state change rate is greater than or equal to 30 polarization filtering state changes per second.

17. The method of claim 14, wherein causing the sensor array to capture at least one image comprises causing the sensor array to capture exactly one image when the multi-twist retarder component is in each polarization filtering state during the cycling.

18. The method of claim 14, further comprising processing the captured images to generate one or more Stokes parameters.

19. The method of claim 18 wherein processing the captured images to generate Stokes parameters comprises processing the captured images to generate one or more Stokes parameters for each of at least a subset of pixels of the sensor array.

20. The method of claim 14, further comprising processing the captured images to generate one or more Stokes parameters in real-time during capture of the images.

21. The method of claim 14, further comprising generating a third polarization-specific video and a fourth polarization-specific video, the third polarization-specific video comprising a third sequence of images captured while the multi-twist retarder component is in a third one of the polarization filtering states, and the fourth polarization-specific video comprising a fourth sequence of images captured while the multi-twist retarder component is in a fourth one of the polarization filtering states.

* * * * *